No. 853,112. PATENTED MAY 7, 1907.
E. T. PETERS.
BICYCLE.
APPLICATION FILED JULY 18, 1906.
2 SHEETS—SHEET 1.
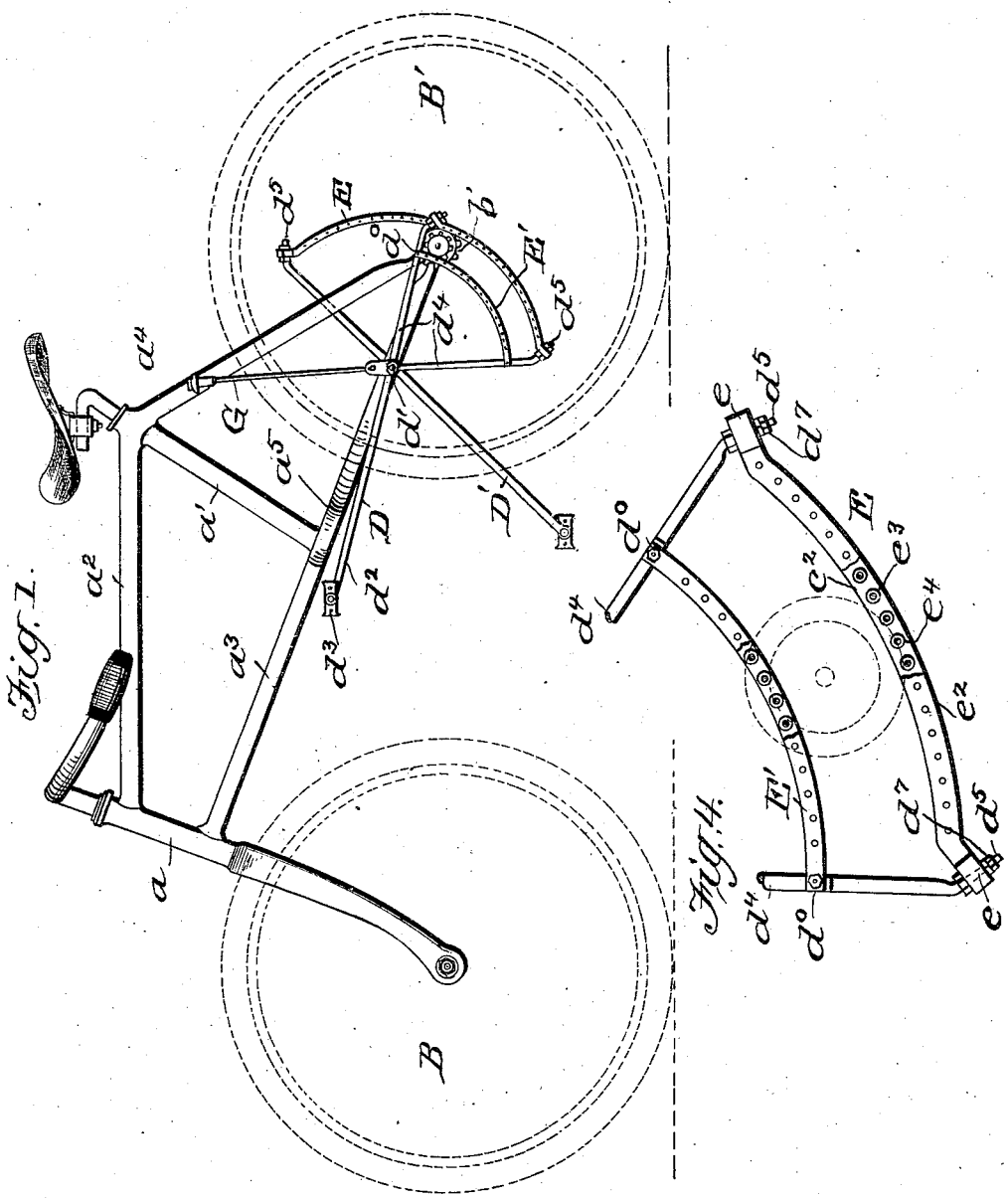
WITNESSES:
Jos. A. Ryan
C. E. Trainor
INVENTOR
Edwin T. Peters
BY Munn & Co.
ATTORNEYS No. 853,112. PATENTED MAY 7, 1907.
E. T. PETERS.
BICYCLE.
APPLICATION FILED JULY 18, 1906.
2 SHEETS—SHEET 2.
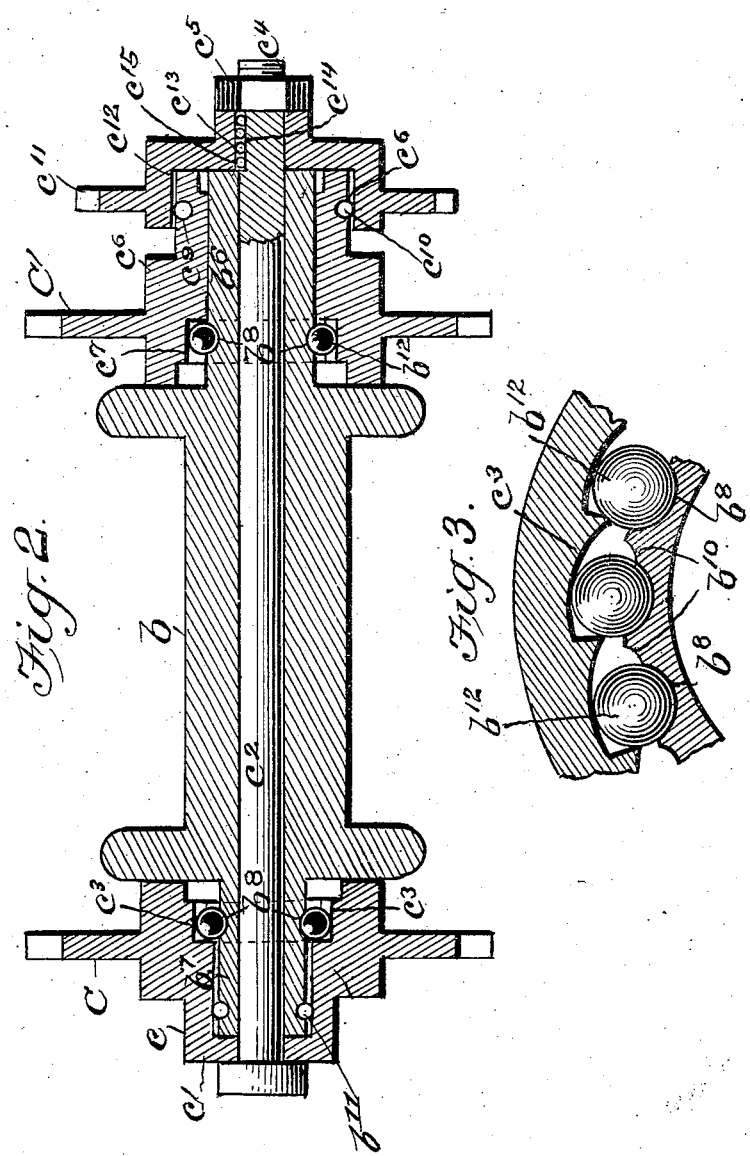
WITNESSES
Jos. A. Ryan
C. E. Trainor
INVENTOR
Edwin T. Peters
BY Munn & Co.
ATTORNEYS

UNITED STATES PATENT OFFICE.

EDWIN THOMPSON PETERS, OF LINCOLN, NEBRASKA.

BICYCLE.

No. 853,112.  Specification of Letters Patent.  Patented May 7, 1907.

Application filed July 18, 1906. Serial No. 326,688.

*To all whom it may concern:*

Be it known that I, EDWIN THOMPSON PETERS, a citizen of the United States, and a resident of Lincoln, in the county of Lancaster and State of Nebraska, have made certain new and useful Improvements in Bicycles, of which the following is a specification.

My invention is an improvement in bicycles, and consists in certain novel constructions and combinations of parts as hereinafter described and claimed.

Referring to the drawings forming a part hereof, Figure 1 is a side view of a bicycle provided with my improvements. Fig. 2 is a longitudinal section through the hub of the rear driving wheel. Fig. 3 is a partial transverse section of the hub on the line of one of the clutch mechanisms. Fig. 4 is a detail of one of the racks.

In the present embodiment of my invention, the frame A comprises the steering sleeve $a$, and the seat post sleeve $a'$, connected by the braces $a^2$, $a^3$, the seat post sleeve having connected thereto the rear forks $a^4$, $a^5$. The lower brace $a^3$ and the lower fork $a^5$, are in the same straight line, this arrangement being permitted by the absence of the crank hanger.

The front wheel B and the steering apparatus connected therewith, are of ordinary construction, and since they form no part of my invention, I have not deemed it necessary to further describe the same. The rear wheel B' is of ordinary construction, having a hollow hub $b$ journaled in the circular bearings $b'$, at the junction of the upper and lower rear forks. The ends $b^6$, $b^7$, of the hub $b$, extend beyond the bearings, and are provided upon their peripheral surfaces adjacent to the bearings, with recesses $b^8$ for receiving the balls $b^{12}$ of a ball clutch, and the extreme end of the extension $b^7$ is provided with a ball groove $b^{11}$, for a purpose to be hereafter set forth. A sprocket wheel C, having a hollow hub $c$, provided with a flange $c'$, secured to a shaft $c^2$, is arranged upon the extension $b^7$ provided with the ball groove, and the inner face of the hub $c$ of the sprocket wheel C, is provided with recesses $c^3$ for cooperating with the balls $b^{12}$ of the ball clutch before mentioned. The deepest portion of these recesses, is at their front ends, and they incline gradually upward at their rear ends, until the said rear ends are on a level with the inner face of the hub.

It is evident from the description that when the sprocket wheel C is rotated in a forward direction, the balls will be forced into contact with the shoulders of the recesses $b^8$, and with the rear ends of the recesses $c^3$ of the hub, in such manner as to clutch the sprocket wheel C to the extended end $b^7$ of the wheel hub, it being understood that the shaft $c^2$ extends through the hollow hub to the other side thereof, and is threaded at its free end as at $c^4$, for receiving a nut $c^5$, whose purpose will be hereafter set forth. The opposite extension $b^6$ of the wheel hub, has a sprocket wheel C' having a hollow hub $c^6$ provided with recesses $c^7$, similar in all respects to the recesses $c^3$ of the hub $c$ of the sprocket wheel C before described. A plurality of balls $b^{12}$ are arranged within the recesses of the hub $c^6$ and the extension $b^6$, whereby to clutch the sprocket wheel C' to the extended end of the hub when the said sprocket wheel is rotated in a forward direction. The peripheral surface of the hollow hub $c^6$ is provided with a ball groove $c^9$ for receiving a series of balls $c^{10}$, and upon the said hollow hub $c^6$ is journaled a second sprocket wheel $c^{11}$ of relatively small diameter, having a recessed hub $c^{12}$ for receiving the hollow hub $c^6$ of the sprocket wheel C'.

The hub $c^{12}$ of the sprocket wheel $c^{11}$ is keyed to the shaft $c^2$ by means of balls $c^{13}$ arranged in a longitudinal groove $c^{14}$ in the shaft $c^2$, and a coacting groove $c^{15}$ in the inner face of the hub of the sprocket wheel $c^{11}$, in such manner that the sprocket wheel $c^{11}$ is constrained to rotate with the shaft $c^2$.

Treadle levers D, D', are pivoted upon the sides of the lower rear fork, upon pins $d'$, projecting from the sides of the said fork, the said treadle levers comprising a portion $d^2$ provided with the ordinary pedal $d^3$ and a forked portion $d^4$, projecting rearwardly from the pivot pin $d'$. The free ends of the forked portion are screw threaded as at $d^5$, and are passed through lateral lugs $e$ upon arc-shaped rack bars E, the screw threaded ends being engaged by nuts $d^7$, whereby to retain the rack bars in proper position.

The rack bars E comprise the arc-shaped side bars $e^2$ connected at intervals by pins $e^3$, having rollers $e^4$ journaled thereon, and are adapted to engage the sprocket wheels C and C' at the rear thereof.

The treadle lever D has secured to the outer side of the forked portion thereof, a second rack bar E', similar in all respects to the rack bars E, and engaging the sprocket wheel $c^{11}$ before described at the front thereof, the said rack being secured to the fork arms by the screws $d^0$. The treadle levers D, D', are arranged in such position with respect to each other, that when the sprocket wheel C is at one end of the rack E, upon the treadle lever D, the sprocket wheel C' will be at the other end of the rack E on the treadle lever D'.

It will be evident from the description that when the treadle lever D is depressed, the wheel B' will be rotated in a forward direction, and that the sprocket wheel $c^{11}$ will be rotated in an opposite direction from that of the rotation of the wheel B, thus turning the sprocket wheel C rearwardly, and moving the treadle lever D' in an opposite direction to the treadle lever D. In other words, the connection of the rack bar E' and the shaft $c^2$, is such that the sprocket wheel C' is always rotated in an opposite direction from that of the sprocket wheel C.

Braces G, are connected with the outer ends of the pivot pins $d'$, and with the upper portion of the upper fork $a^4$, whereby to relieve the strain upon the said pivot pins.

I claim:

1. In a bicycle, the combination with the frame, of a rear wheel having a hollow hub journaled in the frame, sprocket wheels journaled on the hub on each side of the frame, clutch connections between the wheels and the hub, whereby to connect the wheels to the hub during the forward rotation of said wheels, treadle levers pivoted to the side of the frame and provided with racks engaging the sprocket wheels, and means for retaining the treadle levers in opposite positions with respect to each other, comprising a shaft rigid with one of the sprocket wheels and extending through the hollow hub, a sprocket wheel keyed on the free end of the shaft, and the rack on the adjacent treadle lever engaging such sprocket wheel whereby to rotate it in an opposite direction to the adjacent sprocket wheel during the movement of the treadle lever.

2. In a bicycle, the combination with the frame, of a rear wheel having a hollow hub journaled in the frame, sprocket wheels journaled on the hub on each side of the frame, clutch connections between the wheels and the hub, whereby to connect the wheels to the hub, during the forward rotation of said wheels, treadle levers pivoted to the sides of the frame and provided with racks engaging the sprocket wheels, one of said sprocket wheels having a shaft rigid therewith, and connected and extending through the hollow hub to a point adjacent to the opposite treadle lever, and a connection between said treadle lever and the shaft, whereby to retain the treadle lever in opposite positions with respect to each other.

3. In a bicycle, the combination with the frame, of a rear wheel having a hollow hub journaled in the frame, sprocket wheels journaled on the hub on each side of the frame, clutch connections between the wheels and the hub, whereby to connect the wheels to the hub during the forward rotation of said wheels, treadle levers pivoted to the side of the frame and provided with racks engaging the sprocket wheels, and a connection between one of the treadle levers and the opposite sprocket wheel and extending through the hub for retaining the treadle levers in opposite positions with respect to each other.

4. In a bicycle, the combination with the frame, of a rear wheel having its hub journaled in the frame, sprocket wheels journaled on the hub on each side of the frame, clutch connections between the wheels and the hub, whereby to connect the wheels to the hub during the forward rotation of said wheel, treadle levers pivoted to the sides of the frame, and provided with racks engaging the sprocket wheels, and a connection between one of the treadle levers and the opposite sprocket wheel for retaining the treadle levers in opposite positions with respect to each other.

EDWIN THOMPSON PETERS.

Witnesses:
CHARLES HAMMOND,
CHARLES W. CADMAN.